US012722162B2

(12) United States Patent
Cao et al.

(10) Patent No.: US 12,722,162 B2
(45) Date of Patent: Sep. 1, 2026

(54) ION GENERATING APPARATUS

(71) Applicant: Panasonic Ecology Systems Guangdong Co., Ltd, Foshan (CN)

(72) Inventors: Zhanxiong Cao, Foshan (CN); Haozhou Chen, Foshan (CN); Guiqing Lai, Foshan (CN); Yinan Liang, Foshan (CN)

(73) Assignee: PANASONIC ECOLOGY SYSTEMS GUANGDONG CO., LTD, Guangdong (CN)

(*) Notice: Subject to any disclaimer, the term of this patent is extended or adjusted under 35 U.S.C. 154(b) by 685 days.

(21) Appl. No.: 18/008,746

(22) PCT Filed: May 12, 2021

(86) PCT No.: PCT/CN2021/093180

§ 371 (c)(1),
(2) Date: Dec. 7, 2022

(87) PCT Pub. No.: WO2022/001380

PCT Pub. Date: Jan. 6, 2022

(65) Prior Publication Data

US 2023/0249196 A1 Aug. 10, 2023

(30) Foreign Application Priority Data

Jun. 30, 2020 (CN) ........................ 202021249063.8

(51) Int. Cl.
*B03C 3/38* (2006.01)
*B03C 3/36* (2006.01)
(Continued)

(52) U.S. Cl.
CPC ................ *B03C 3/38* (2013.01); *B03C 3/368* (2013.01); *B03C 3/68* (2013.01); *B60H 3/0078* (2013.01); *B03C 2201/30* (2013.01)

(58) Field of Classification Search
CPC .. B03C 3/38; B03C 3/368; B03C 3/68; B03C 2201/30; A61L 9/22; B60H 3/0078; H01T 23/00; F24F 8/30
See application file for complete search history.

(56) References Cited

U.S. PATENT DOCUMENTS

2003/0012039 A1* 1/2003 Wiser, III .............. H02M 7/10 363/37
2018/0195750 A1* 7/2018 Wu ..................... F24F 11/0001
2021/0129070 A1* 5/2021 Han ...................... B01D 47/16

FOREIGN PATENT DOCUMENTS

CN 2100047 U 3/1992
CN 1848568 A 10/2006
(Continued)

OTHER PUBLICATIONS

Office Action (Notice of Reasons for Refusal) issued Apr. 16, 2024, by the Japan Patent Office in corresponding Japanese Patent Application No. 2022-573758 and an English translation of the Office Action. (12 pages).

(Continued)

*Primary Examiner* — Jennifer Dieterle
*Assistant Examiner* — Sonji Turner
(74) *Attorney, Agent, or Firm* — Buchanan Ingersoll & Rooney P.C

(57) ABSTRACT

Provided is an ion generating apparatus, including a housing and an ion generating unit. A waterproof part is provided below an air outlet. The waterproof part includes a discharge port penetrating the waterproof part and in communication with an inside of the housing, and a guide part having a receiving space for receiving a liquid flowing in from the air outlet and guiding the liquid to the discharge port while bypassing an ion exhaust port. By providing the waterproof part below the air outlet to receive the liquid flowing in from the air outlet, the ion generating apparatus may not only
(Continued)

prevent the liquid from entering the ion generating unit through the ion exhaust port to affect an ion generation, but also allow a liquid entering the inside of the housing to flow out of the housing along a path that does not come into contact with an electrical component.

12 Claims, 9 Drawing Sheets

(51) Int. Cl.
*B03C 3/68* (2006.01)
*B60H 3/00* (2006.01)

(56) References Cited

FOREIGN PATENT DOCUMENTS

| | | | | | |
|---|---|---|---|---|---|
| CN | 203291081 | U | | 11/2013 | |
| CN | 105953315 | A | * | 9/2016 | ................ F24F 8/30 |
| CN | 205878371 | U | * | 1/2017 | |
| CN | 107461822 | A | | 12/2017 | |
| CN | 206781493 | U | | 12/2017 | |
| JP | 2006043005 | A | | 2/2006 | |
| JP | 2014020611 | A | * | 2/2014 | |
| JP | 2015-029799 | A | | 2/2015 | |

OTHER PUBLICATIONS

International Search Report and Written Opinion issued in PCT/CN2021/093180 mailed Aug. 10, 2021, with partial English translation, 9 pages.

* cited by examiner

FIG. 1 – Prior Art

ION GENERATING APPARATUS

CROSS REFERENCE TO RELATED APPLICATION(S)

This application is a U.S. National Phase Application of International Application No. PCT/CN2021/093180, filed on May 12, 2021, which claims priority to Chinese Patent Application No. 202021249063.8 entitled "ion generating apparatus", filed on Jun. 30, 2020, the entire content of which is incorporated herein by reference in its entirety.

TECHNICAL FIELD OF THE INVENTION

The present disclosure relates to a field of air purification, and in particular, to an ion generating apparatus.

BACKGROUND OF THE INVENTION

Related art (CN201910732125.6) discloses a vehicle-mounted air purifier. As shown in FIG. 1, a vehicle-mounted air purifier 1 includes: a housing 10 having an air inlet 11 and an air outlet 12; an air supply cavity 14 and an electric control cavity 16 located on a side of the air supply cavity 14 close to the air outlet 12; a fan 30 disposed in the air supply cavity 14; a control circuit unit 40 disposed in the electric control cavity 16; and a filter element 20 disposed below the fan 30 for filtering air.

Air is filtered by the filter element 20 after entering from the air inlet 11 disposed on a side surface, mixed with substances that may improve an air quality in a storage groove, sent to the air supply cavity 14 through the fan 30, and then discharged out of the air outlet 12 disposed on a top surface.

However, when a liquid such as water is sprinkled on the vehicle-mounted air purifier 1, the water flows into the housing 10 from the air outlet 12 disposed on the top surface, and a part of the water flows into the electric control cavity 16 from an overlapping portion of the electric control cavity 16 and the air outlet 12, comes into contact with the control circuit unit 40 disposed in the electronic control cavity 16, thereby damaging a circuit board and live parts. In addition, a part of the water enters the storage groove disposed below the fan 30 along the air supply cavity 14, comes into contact with a negative ion generating unit disposed in the storage groove, thereby affecting a generation of substances, such as ions, that may improve the air quality.

SUMMARY OF THE INVENTION

(1) Technical Problems to be Solved

The present disclosure provides an ion generating apparatus that may effectively prevent an external liquid from contacting an internal ion generator, an electrical component and the like to improve waterproofness and safety, so as to solve problems in the related art, such as damage to the apparatus and potential safety hazards caused by an inflow of the external liquid.

(2) Technical Solutions

In order to solve the above-mentioned technical problems, the present disclosure provides an ion generating apparatus, including: a housing provided with an air inlet and an air outlet; and an ion generating unit provided with an ion generator for generating an ion and an ion exhaust port for discharging the generated ion, wherein the ion discharged out of the ion exhaust port is discharged out of the housing through the air outlet, wherein, a waterproof part is provided below the air outlet, and the waterproof part includes: a discharge port penetrating the waterproof part, and the discharge port is in communication with an inside of the housing; and a guide part having a receiving space for receiving a liquid flowing in from the air outlet and guiding the liquid to the discharge port while bypassing the ion exhaust port.

According to the embodiments, the ion exhaust port is disposed below a part of the discharge port, and a part of the guide part is formed as an inclined surface inclined upward in a direction from a side connected with the discharge port to the ion exhaust port and away from the discharge port.

According to the embodiments, the guide part includes a water accumulating part and a flow guide, the water accumulating part, the flow guide and the discharge port are sequentially connected with each other to form a closed loop, and a bottom surface of the water accumulating part is parallel to a horizontal plane and the flow guide includes the inclined surface.

According to the embodiments, an outer circumferential edge of the ion exhaust port is provided with an extending wall extending upward, and an upper end of the extending wall is higher than a bottom surface of the waterproof part.

According to the embodiments, the ion exhaust port is horizontally staggered from the air outlet, and the waterproof part includes an air guide part extending upward from a side of the ion exhaust port away from the air outlet to a side of the air outlet.

According to the embodiments, the housing further includes an air supply unit, and the air supply unit includes: a motor; a fan blade configured to rotate through a drive of the motor and guide a flow of air; and a casing accommodating the motor and the fan blade, wherein the casing includes an exhaust inlet and an air outlet, air entering through the air inlet enters the casing from the exhaust inlet and is discharged out of the casing through the exhaust outlet under an guidance of the fan blade, and a lower end of the exhaust inlet is lower than a lower end of the motor.

According to the embodiments, the exhaust outlet is adjacent to the ion exhaust port and is disposed below another part of the discharge port, and a liquid discharged out of the discharge port flows into the air supply unit through the exhaust outlet.

According to the embodiments, the housing includes a partition plate disposed horizontally and configured to divide an inner space of the housing into a first space at an upper portion and a second space at a lower portion, the first space is configured to accommodate the air supply unit and the ion generating unit; and the second space includes an electrical component cavity installed with an electronic component and a cavity other than the electrical component cavity.

According to the embodiments, the partition plate includes: a receiving area located below the air supply unit and configured to receive the liquid flowing out from the air supply unit, wherein the receiving area is provided with a vertical wall at an edge of the receiving area adjacent to an inner wall of the housing; and a diverging area connected to the receiving area and configured to diverge the liquid in the receiving area to be discharged out of the housing.

According to the embodiments, the diverging area includes: a first drainage opening penetrating a side surface of the housing, and an opening located close to the first drainage opening, and the opening penetrates the partition plate above the cavity.

According to the embodiments, a second drainage opening penetrating the housing is provided on a bottom surface of the housing, and the second drainage opening is in communication with the cavity.

According to the embodiments, ion generating apparatus further includes a control part configured to control the air supply unit and the ion generating unit.

(3) Beneficial Effects

Through the above-mentioned technical solutions of the present disclosure, the waterproof part is disposed below the air outlet to receive the liquid flowing in from the air outlet, and a flow path of the inflowing liquid is controlled, which may not only prevent the liquid from entering the ion generating unit from the ion exhaust port to affect a generation of ions, but also allow the liquid entering the inside of the housing to flow out of the housing along a path that does not come into contact with electrical component.

Figure 1:
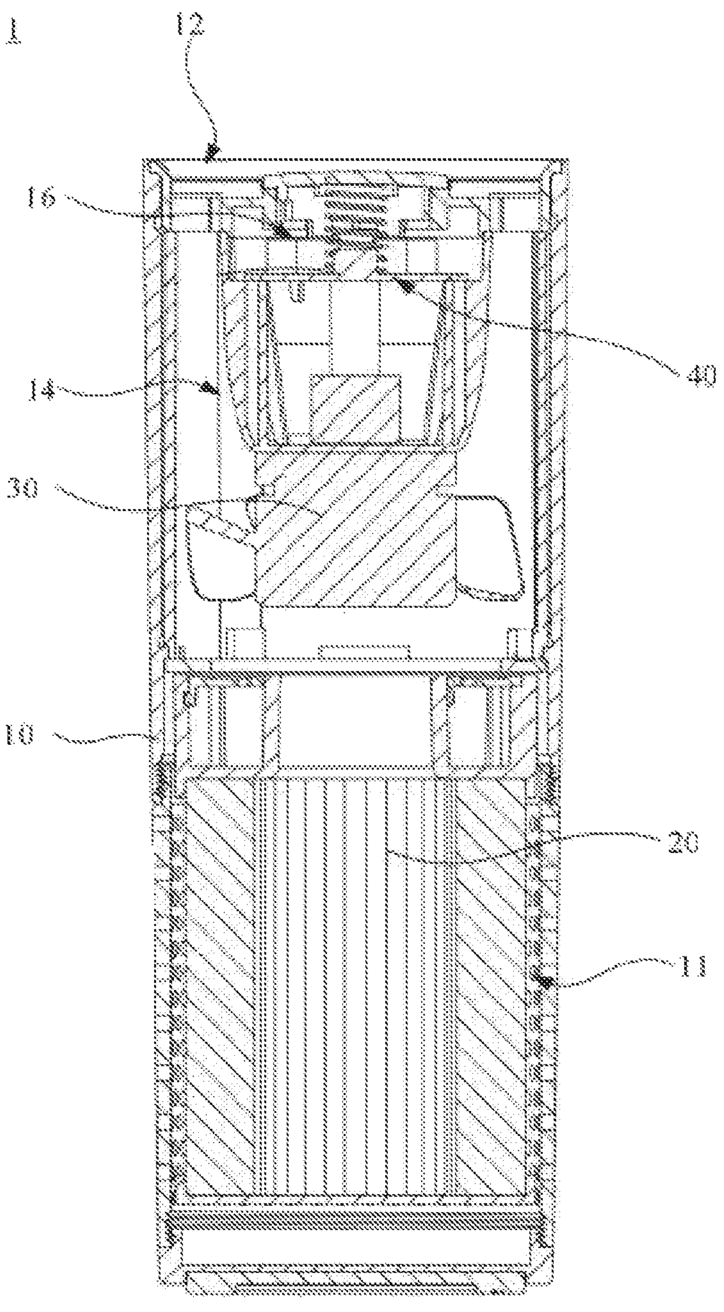
FIG. 1 is a cross-sectional view of a vehicle-mounted air purifier according to the related art.

In the drawings, 1: vehicle-mounted air purifier; 11: air inlet; 12: air outlet; 14: air supply cavity; 16: electric control cavity; 30: fan; 40: control circuit unit; 20: filter element; 10: ion generating apparatus; 100: housing; 200: waterproof part; 300: ion generating unit; 400: casing; 500: partition plate; 600: control part; 610: control component; 100-1: top surface; 100-2: bottom surface; 100-3: side surface; 110: air inlet; 120: air outlet; 130: first space; 140: second space; 100-31: first side surface; 100-32: second side surface; 120-1: circular space; 210: water accumulating part; 220: flow guide; 230: discharge port; 230-1: a part of a discharge port in communication with an ion exhaust port; 230-2: another part of the discharge port in communication with the air supply unit; 240: air guide; 250: guide part; 260: boss; 200-1: bottom surface; 200-2: inner sidewall; 200-3: outer sidewall; 200-4: receiving space; G1: first interval; G2: second interval; 200-5: inclined surface; 200-51: first part; 200-52: second part; 310: ion exhaust port; 310-1: extending wall; 320: ion air duct; 330: ion generator; 410: exhaust inlet; 420: exhaust outlet; 500: partition plate; 510: vertical wall; 520: receiving area; 530: diverging area; 540: first drainage opening; 550: second drainage opening; 560: opening; 140-1: electrical component cavity; 140-2: cavity.

DETAILED DESCRIPTION OF EMBODIMENTS

In order to make objectives, technical solutions and advantages of embodiments of the present disclosure clearer, technical solutions in embodiments of the present disclosure will be described clearly and completely below with reference to the accompanying drawings in embodiments of the present disclosure. Obviously, the described embodiments are only some embodiments, but not all embodiments of the present disclosure. Based on embodiments of the present disclosure, all other embodiments acquired by those skilled in the art without any creative work should fall within the scope of protection of the present disclosure.

In the accompanying drawings, a second description of the same numeral for the same component and descriptions of components not directly related to the present disclosure will be omitted or abbreviated. In the following descriptions, orientation words such as up, down, left, right, above and below, etc., are all described based on states shown in the drawings of the ion generating apparatus in the embodiments of the present disclosure, that is, installation states. In the following descriptions, orientation words such as an upstream side and a downstream side are all defined with reference to a direction in which air flows in the ion generating apparatus.

In the description of the present disclosure, it should be noted that, unless otherwise expressly specified and limited, the term "connected" or "coupled" should be understood in a broad sense, for example, it may be a fixed connection, a detachable connection, or an integrated connection; it may be a mechanical connection or an electrical connection; it may be a direct connection or an indirect connection via an intermediate medium. For those of ordinary skill in the art, specific meanings of the above-mentioned terms in the present disclosure may be understood according to specific situations.

The ion generating apparatus according to the present disclosure will be described in detail below with reference to FIG. 2 to FIG. 9.

Figure 2:
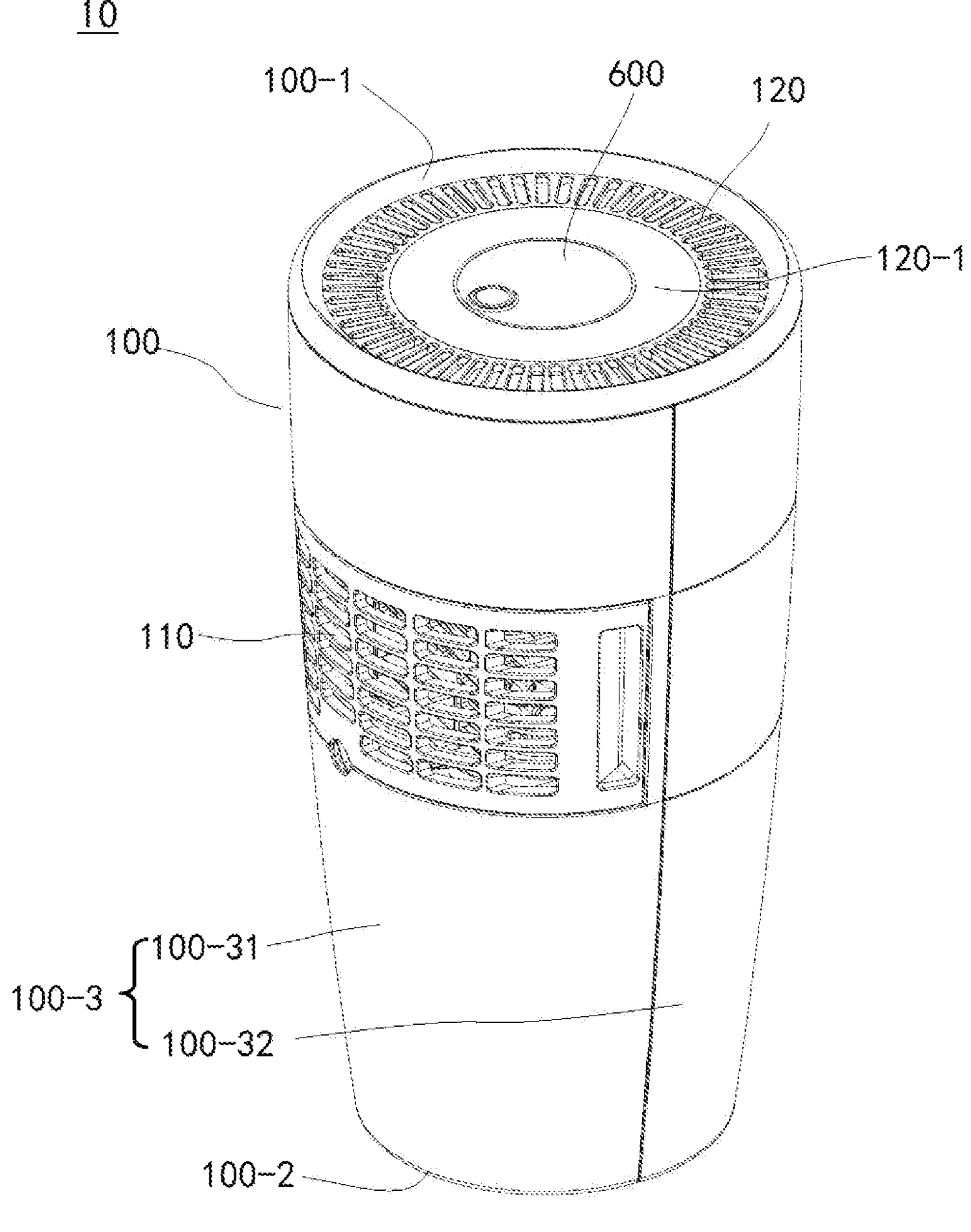
FIG. 2 is a schematic structural diagram of an ion generating apparatus according to the present disclosure.

FIG. 2 is a schematic structural diagram of an ion generating apparatus according to an embodiment of the present disclosure. Referring to FIG. 2, an ion generating apparatus 10 includes a housing 100, a waterproof part 200, an ion generating unit 300, an air supply unit, and a control part 600.

The housing 100 forms an outer contour in a shape of a hollow truncated cone. Specifically, the housing 100 includes a top surface 100-1 and a bottom surface 100-2 that are disposed horizontally and in parallel, and a side surface 100-3 disposed substantially vertically between the top surface 100-1 and the bottom surface 100-2. The top surface 100-1 and the bottom surface 100-2 are circular, and have diameters that are the same or different from each other; the side surface 100-3 has an arcuate profile. A space enclosed by the top surface 100-1, the bottom surface 100-2, and the side surface 100-3 is accommodated with units or components that may achieve an ion generation function, an air supply function, an air purification function, and the like. Specifically, the side surface 100-3 may include a first side surface 100-31 and a second side surface 100-32 that are detachable. Sizes of the first side surface 100-31 and the second side surface 100-32 may be equal to each other. The components inside the ion generating apparatus 10 may be easily maintained and replaced through detachment.

The housing 100 is provided with an air inlet 110 and an air outlet 120.

The air inlet 110 is provided on the side surface 100-3 of the housing 100 and is located in an upper portion (e.g., in a subsequently described first space) of the housing 100, and the air inlet 110 is an opening for inhaling air outside the housing 100. Specifically, the air outside the housing 100 may enter an inside of the housing 100 through the air inlet 110, so that an air supply function and an ion generation function are achieved through an air supply unit and an ion generation unit 300 described subsequently. Specifically, the air inlet 110 may be designed to include a plurality of laterally extended stripe-shaped openings, the plurality of laterally extended stripe-shaped openings may be longitudinally arranged in parallel in a column, and a plurality of the columns may be laterally arranged, so as to form the air inlet 110 in a shape of a grille as shown in FIG. 2. The present disclosure is not limited thereto, and a structure and a design arrangement of the air inlet 110 may be changed and adjusted as required.

The air outlet 120 is disposed on the top surface 100-1 of the housing 100 to achieve an upward blowing, so that air inhaled from the air inlet 110 is blown out from inside of the housing 100 after being processed. Specifically, a structure of the air outlet 120 may be adaptively adjusted according to a shape of the top surface 100-1 of the housing 100. In the embodiment shown in FIG. 2, the air outlet 120 may be formed in a ring shape extending along a circumference of the circular top surface 100-1. An outer circumferential edge of the air outlet 120 is close to a circumferential edge of the top surface 100-1 of the housing 100, and an inner circumferential edge of the air outlet 120 is formed as a circular space 120-1. A control part 600 may be provided at a position of the circular space 120-1 so as to facilitate a user to operate the ion generating apparatus 10 of the present disclosure. The air outlet 120 includes a plurality of radially extended stripe-shaped openings arranged in a circumferential direction. The structure of the air outlet 120 is not limited to thereto, it may be adjusted according to the shape of the top surface 100-1 of the housing 100. For example, when the top surface 100-1 is formed as a rectangle or a square, the air outlet 120 may be formed as a “回” shape.

Figure 3:
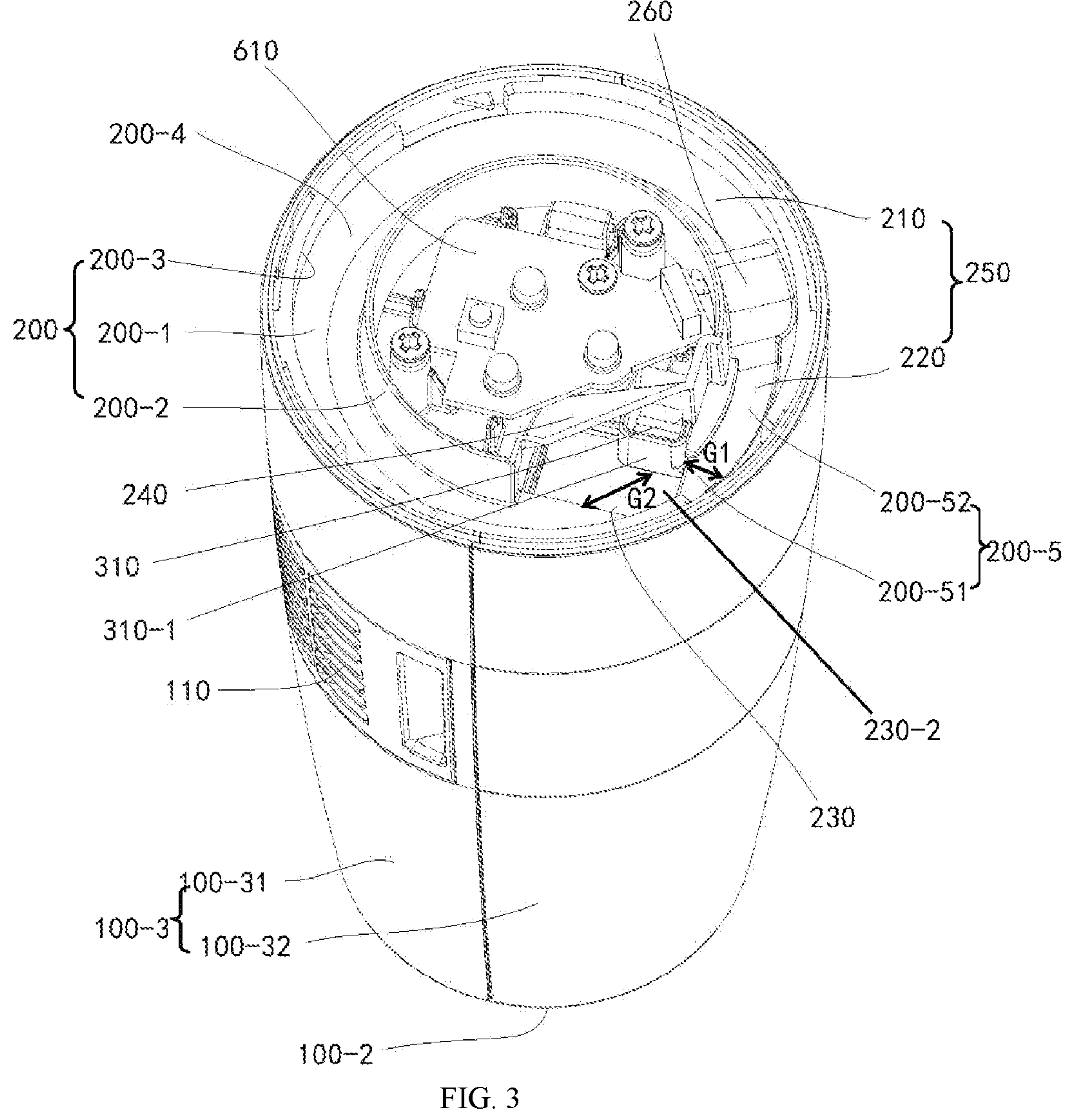
FIG. 3 is a schematic structural diagram in which a top surface provided with an air outlet and a control part is removed from the structure shown in FIG. 2.
Figure 4:
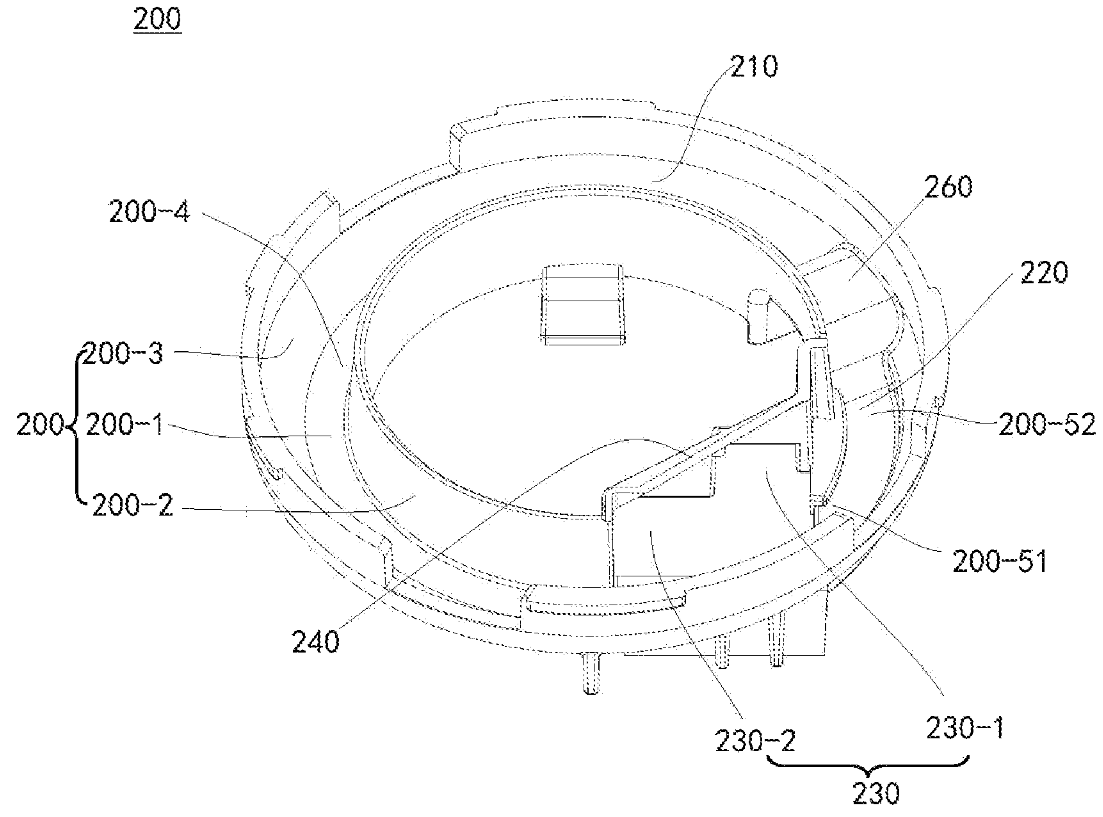
FIG. 4 is a schematic structural diagram of a waterproof part shown in FIG. 3.

FIG. 3 is a schematic structural diagram in which a top surface provided with the air outlet and the control part is removed from the structure shown in FIG. 2, and FIG. 4 is a schematic structural diagram of a waterproof part shown in FIG. 3. A detailed description will be provided below with reference to FIG. 3 and FIG. 4.

The waterproof part 200 is disposed below the air outlet 120 and is formed as a ring shape corresponding to the shape of the air outlet 120. By adapting to the shape of the air outlet 120, the waterproof part 200 may receive a liquid flowing in from the air outlet 120 to a maximum extent, thereby improving an airtightness. Specifically, the waterproof part 200 includes a bottom surface 200-1, an inner sidewall 200-2, and an outer sidewall 200-3. The bottom surface 200-1 extends along a circumferential edge and is substantially parallel to a horizontal plane. “Substantially parallel to a horizontal plane” means that a major part may be parallel to the horizontal plane while a minor part may have an inclination. The inner sidewall 200-2 extends vertically upward from an inner side edge of the bottom surface 200-1, and the outer sidewall 200-3 extends vertically upward from an outer side edge of the bottom surface 200-1. Specifically, the outer sidewall 200-3 is close to an outer edge of the top surface 100-1 of the housing 100, and is closely attached to an inner side near a top end of the side surface 100-3 of the housing 100, and a space enclosed by an inner side of the inner sidewall 200-2 corresponds to the circular space 120-1 formed by the inner circumferential edge of the air outlet 120. The space enclosed by the inner side of the inner sidewall 200-2 is provided with a control component 610 corresponding to the control part 600, and the control component 610 is located below the control part 600. The bottom surface 200-1, the inner sidewall 200-2 and the outer sidewall 200-3 form a groove-like receiving space 200-4 that may receive and accommodate the liquid flowing in from the air outlet 120.

Specifically, the waterproof part 200 includes a discharge port 230 and a guide part 250. The discharge port 230 is provided on the bottom surface 200-1, that is, the discharge port 230 is formed as a hole penetrating the bottom surface 200-1. A lower portion of the discharge port 230 corresponds to an inner space of the housing 100. The liquid flowing in from the air outlet 120 received and accommodated by the receiving space 200-4 of the waterproof part 200 may be discharged to the inner space of the housing 100 through the discharge port 230. The guide part 250 is a structure formed by the bottom surface 200-1, the inner sidewall 200-2 and the outer sidewall 200-3 except for the discharge port 230. The guide part 250 may receive the liquid flowing in from the air outlet 120 and guide a flow of the liquid. Specifically, the guide part 250 may guide the liquid to flow toward the discharge port 230 to be discharged out of the discharge port 230 while bypassing a subsequently described ion exhaust port 310, thereby preventing the liquid from entering the ion generating unit 300 from the ion exhaust port 310. Specifically, a lower portion of a part 230-1 of the discharge port 230 is in communication with the ion exhaust port 310, and a lower portion of another part 230-2 of the discharge port 230 is in communication with a subsequently described air supply unit. Through a guidance of the guide part 250, the liquid in the waterproof part 200 may bypass the ion exhaust port 310 and flow into the air supply unit from the another part 230-2 of the discharge port 230 that is in communication with the air supply unit.

Specifically, the ion exhaust port 310 is disposed below the part 230-1 of the discharge port 230 opposite to the part 230-1 of the discharge port 230. Specifically, the ion exhaust port 310 may be aligned with the part 230-1 of the discharge port 230 so as to communicate the ion exhaust port 310 with the discharge port 230. For example, the ion exhaust port 310 may be disposed below the part 230-1 of the discharge port 230 or flush with the part 230-1 of the discharge port 230 in a manner of being immediately adjacent to the part 230-1 of the discharge port 230. Specifically, an area of the discharge port 230 is greater than an area of the ion exhaust port 310, so that the ion exhaust port 310 is disposed opposite to a part of the discharge port 230. On one hand, the ion exhaust port 310 is disposed on a side close to a central axis of the discharge port 230 in a radial direction, that is, a first space G1 is formed between the ion exhaust port 310 and the side surface 100-3 of the housing 100 in the radial direction, and the first space G1 is filled by the bottom surface 200-1 of the waterproof part 200. That is, the ion exhaust port 310 is connected to the side surface 100-3 of the housing 100 through the bottom surface 200-1 filling the first interval G1, so that a liquid flows along the bottom surface 200-1 at the first interval G1. On the other hand, the ion exhaust port 310 is disposed at one end of the discharge port 230 in a circumferential direction, that is, a second interval G2 is formed between the ion exhaust port 310 and the other end of the discharge port 230 in the circumferential direction, and the another part 230-2 of the discharge port 230 whose lower portion being in communication with the air supply unit is formed at the second interval G2, so that the liquid is discharged out of the another part 230-2 of the discharge port 230 at the second interval G2. The "radial direction" refers to a direction from a center to an edge to a center along a diameter of the circle or from an edge to a center along a diameter of the circle, and the "circumferential direction" refers to a direction perpendicular to a radial direction along an edge of the circle.

Specifically, a part of the guide part 250 is formed as an inclined surface 200-5 that is inclined upward in a direction from an end connected to the discharge port 230 radially toward the ion exhaust port 310 and circumferentially away from the discharge port 230. The inclined surface 200-5 is formed to be inclined upward in a direction radially from a side connected to the side surface 100-3 of the housing 100 toward the ion exhaust port 230 and circumferentially from an end connected to the discharge port 230 away from the discharge port 230. Specifically, on the basis of the above-mentioned first interval G1 and second interval G2, the inclined surface 200-5 includes a first part 200-51, the first part 200-51 is the bottom surface 200-1 formed at the interval G1, and is formed to be inclined upward in a direction radially from an outer edge (i.e., the side surface 100-3 of the housing 100) connected to the discharge port 230 toward the ion exhaust port 310 and inclined upward in a direction circumferentially from an end of the discharge port 230 provided with the ion exhaust port 310 away from the other end of the discharge port 310, so that the liquid may bypass the ion exhaust port 310 and is discharged out of the discharge port 230. The inclined surface 200-5 also includes a second part 200-52 connected to the first portion 200-51 and continuing to be inclined upward in a direction circumferentially away from the discharge port 230. Preferably, the second part 200-52 may also have an inclination that inclines radially from the outer side to the inner side so as to further guide the liquid away from the ion exhaust port 310. By providing the inclined surface 200-5, the liquid received by the receiving space 200-4 of the waterproof part 200 may be guided to bypass the ion exhaust port 310 and be discharged out of the discharge port 230.

Specifically, the guide part 250 includes a water accumulating part 210 and a flow guide 220. One end of the water accumulating part 210 is connected to the discharge port 230 and one end of the flow guide 220 is connected to the discharge port 230, and the other end of the water accumulating part 210 is connected to the other end of the flow guide 220. That is, the water accumulating part 210, the flow guide 220 and the discharge port 230 are connected to each other end to end so as to form a closed loop. The closed loop may be formed as a circle, a square, an oval, a body shape, a prism, or other irregular shapes. Specifically, the water accumulating part 210, the flow guide 220 and the discharge port 230 are connected to each other end to end so as to form a ring shape, that is, a ring-shaped waterproof part 200 is formed. A length of the water accumulating part 210 is greater than a length of the flow guide 220, and the ion exhaust port 310 is disposed at one end close to the flow guide 220 in the circumferential direction. The bottom surface 200-1 of the flow guide 220 includes the above-mentioned inclined surface 200-5. On one hand, the inclined surface 200-5 is inclined upward in a direction from an end connected to the discharge port 230 away from the discharge port 230, so that the liquid entering the flow guide 220 flows rapidly to the discharge port 230 under a guidance of the inclined surface 200-5 and then discharged. On the other hand, the inclined surface 200-5 is inclined upward in a direction from the end connected to the discharge port 230 to the ion exhaust port 310, so that the liquid entering the flow guide 220 does not flow to the ion exhaust port 310, but flows to the discharge port 230 in a direction away from the ion exhaust port 310 and then discharged. The flow guide 220 may rapidly guide the liquid to be discharged out of the discharge port 230 so as to prevent the liquid in the waterproof part 200 from overflowing into the ion exhaust port 310 due to a limitation of a discharge speed when the liquid in the waterproof part 200 accumulates too much and becomes full.

One end of the water accumulating part 210 is connected to one end of the discharge port 230 away from the ion exhaust port 310, and the other end is connected to the flow guide 220. The water accumulating part 210 has a U-shaped cross section, and the bottom surface 200-1 is parallel to a horizontal plane, that is, a line connecting lowest points of the water accumulating part 210 is parallel to the horizontal plane. Therefore, a small amount of the liquid may stay in the water accumulating part 210 without being discharged out of the discharge port 230 to the inside of the housing 100. When the accumulated liquid is gradually increasing, the accumulated liquid may be slowly discharged out of the discharge port 230 to the inside of the housing 100. The water accumulating part 210 and the flow guide 220 cooperate with each other, which may prevent the liquid from flowing rapidly to the discharge port 230 so that the liquid may be crowded at the discharge port 230 and thus overflow to the ion exhaust port 310, and may prevent the liquid from flowing slowly to the discharge port 230 so that the liquid accumulated in the water accumulating part 210 overflows to the ion exhaust port 310. The water accumulating part 210 and the flow guide 220 cooperate with each other to effectively divert the liquid, so as to discharge the liquid orderly and efficiently.

According to the embodiment of the present disclosure, the water accumulating part 210 and the flow guide 220 are connected to each other through a boss 260. The boss 260 may effectively separate the water accumulating part 210 from the flow guide 220. Specifically, the boss 260 is higher than bottom surfaces of both the water accumulating part 210 and the flow guide 220, so as to form a resistance in a liquid communication between the water accumulating part 210 and the flow guide 220. The resistance may achieve the following effects: on one hand, when the liquid accumulated in the water accumulating part 210 reaches a certain amount, that is, when the liquid reaches a height of the boss 260, the liquid may flow over the boss 260 into the flow guide 220, and the liquid flowing into the flow guide 220 may rapidly flow to the discharge port 230 under an action of the flow guide 220, so that the liquid in the water accumulation part 210 may be prevented from being excessively accumulated and overflowing; on the other hand, when the liquid accumulated in the water accumulating part 210 does not reach the certain amount, the liquid may not flow over the boss 260 into the flow guide 220, which may prevent the liquid from flowing into the flow guide 220 even when there is very little liquid in the water accumulating part 210 so that too much liquid may flow through the flow guide 220 to the discharge port 230 and overflow, thereby achieving an orderly and efficient discharge of the liquid.

The ion exhaust port 310 is horizontally staggered from the air outlet 120, that is, the ion exhaust port 310 is located on an inner side of the air outlet 120 in the radial direction. On the other hand, the ion exhaust port 310 is located on an upstream side of the air outlet 120, that is, below the air outlet 120. In order to prevent the liquid flowing in from the air outlet 120 from flowing obliquely upward into the ion exhaust port 310, the waterproof part 200 includes an air guide 240.

Specifically, the air guide 240 extends obliquely upward from a side of the ion exhaust port 310 away from the air outlet 120 toward the air outlet 120. That is, the air guide 240 extends upward and radially outward from an inner side of the ion exhaust port 310 in the radial direction, which is equivalent to an inclined protective cover provided on the ion exhaust port 310. The air guide 240 may not only guide the air with ions that are discharged out of the ion exhaust port 310 toward the air outlet 120 obliquely upward, but may also prevent the liquid flowing in from the air outlet 120 from directly entering the ion exhaust port 310.

In addition, in order to further prevent the liquid from flowing into the ion exhaust port 310, an extending wall 310-1 extending vertically upward is provided on an outer peripheral edge of the ion exhaust port 310, and a height of the extending wall 310-1 is higher than the bottom surface 200-1 of the waterproof part 200, that is, an upper end of the extending wall 310-1 is higher than the bottom surface 200-1 of the waterproof part 200, thus the extending wall 310-1 may further prevent the liquid from flowing into the ion exhaust port 310. According to the embodiment, the extending wall 310-1 on a side close to the flow guide 220 forms the inner sidewall 200-2 of the flow guide 220, which may prevent the liquid flowing through the flow guide 220 from overflowing into the ion exhaust port 310.

The above-mentioned method of disposing the inclined surface 200-5 and the method of disposing the extending wall 310-1 may be used alone or in combination, and may be selected as required.

Figure 5:
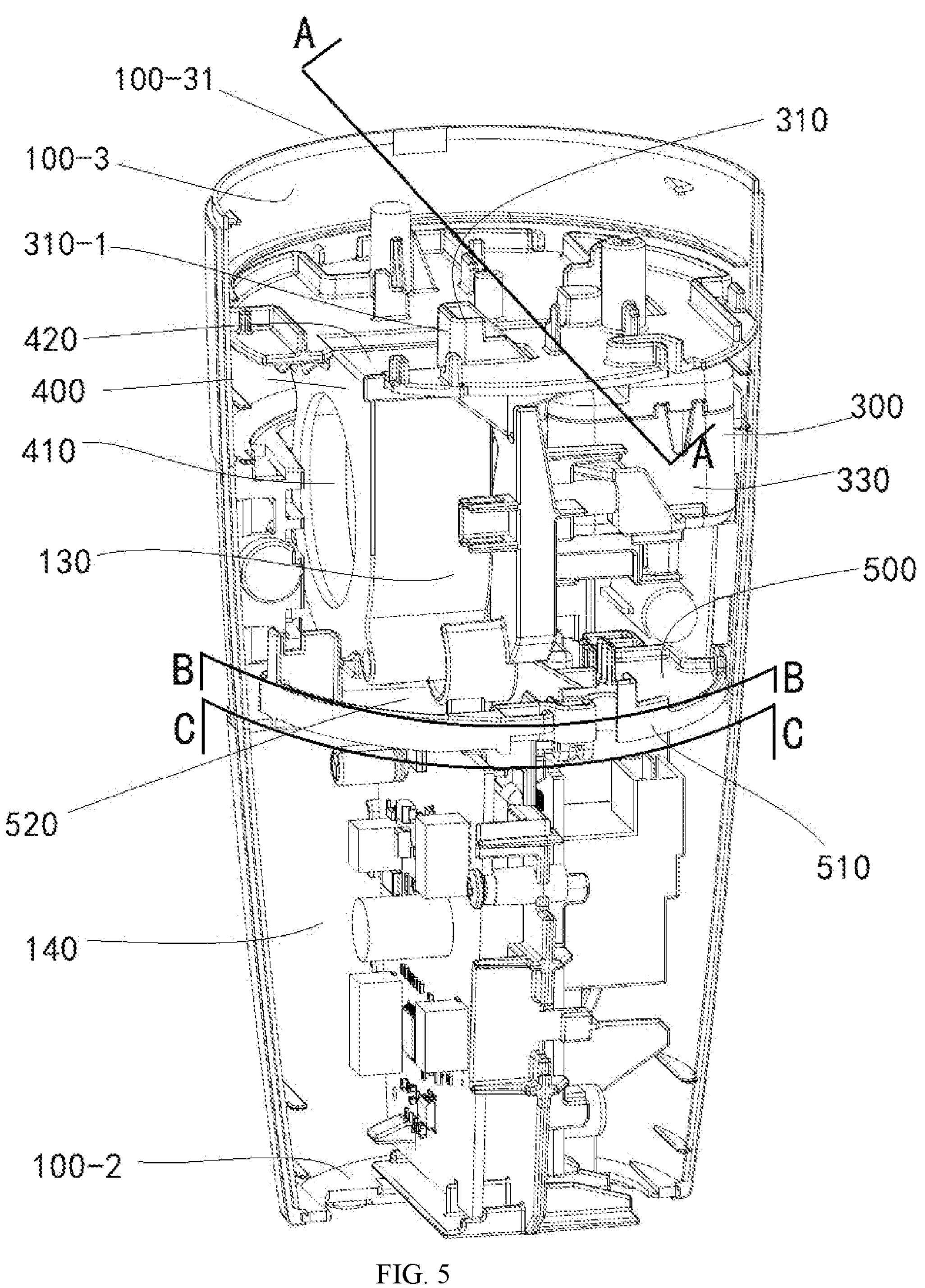
FIG. 5 is a schematic structural diagram in which a waterproof part and a control component of the control part are removed from the structure shown in FIG. 3, and a part of the housing is not shown in order to show an internal result.
Figure 6:
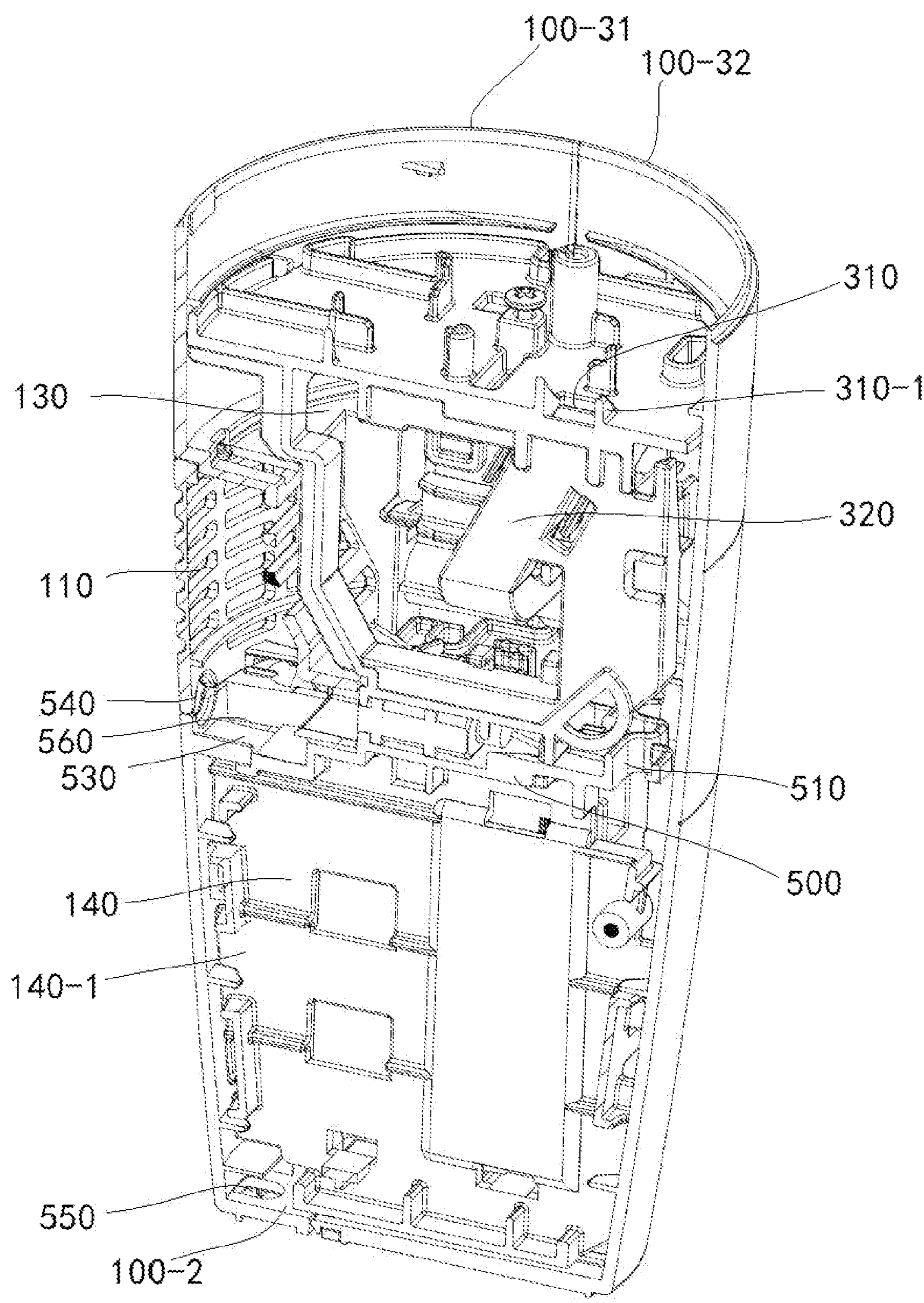
FIG. 6 is a longitudinal cross-sectional view taken along line A-A of FIG. 5.

FIG. 5 is a schematic structural diagram in which the waterproof part, and the control component of the control part are removed from the structure shown in FIG. 3, and a part of the housing is not shown in order to show an internal result. FIG. 6 is a longitudinal cross-sectional view taken along line A-A of FIG. 5. The ion generating unit 300 and the air supply unit will be described in detail with reference to FIG. 5 and FIG. 6.

The ion generating unit 300 is an apparatus that generates air ions by applying a voltage to a discharge electrode and generating corona discharge at the discharge electrode. Specifically, the ion generating unit may also be an apparatus that generates charged microparticle liquid containing ionic groups by providing a liquid to a discharge electrode and generating corona discharge at the discharge electrode. The ion generating unit 300 may include an ion generator 330 that generates ions using ambient air and an ion exhaust port 310 that exhausts the generated ions.

In addition, the ion generating unit 300 may further include an ion air duct 320. One end of the ion air duct 320 is disposed on a downstream side of the ion generator 330, and then extends upward to the ion exhaust port 310. The ion air duct is a channel communicate the ion generator 330 with the ion exhaust port 310 and may guide the ions generated by the ion generator 330 to the ion exhaust port 310. As described above, the ion exhaust port 310 is provided at the other end of the ion air duct 320.

The ion exhaust port 310 is positioned opposite to the discharge port 230 as described above, and the outer circumferential edge of the ion exhaust port 310 is provided with the extending wall 310-1. Ions blown out from the ion exhaust port are blown out to the air outlet 120 along the extending wall 310-1 and the above-mentioned air guide 240 and are discharged out of the housing 100. As described above, the ion exhaust port 310 is disposed on an upstream side of the air outlet 120, i.e., below the air outlet 120, horizontally staggered from the air outlet 120, and disposed opposite to the discharge port 230, which will not be repeated here.

The air supply unit includes a motor (not shown in the drawing), a fan blade (not shown in the drawing), and a casing 400.

After being powered on, the motor may rotate around a rotating shaft of the motor so as to drive the fan blade to rotate.

The fan blade is connected with the rotating shaft of the motor. The fan blade rotates under a drive of the rotating shaft of the motor, and guides a flow of air.

A fan blade and a motor are disposed inside the casing 400. The casing 400 includes an exhaust inlet 410 and an exhaust outlet 420. For example, as described above, the fan blade rotates under the drive of the motor and guides the flow of air. For example, air from the air inlet 110 enters the casing 400 from the exhaust inlet 410, and is then discharged out of the exhaust outlet 420.

Specifically, the exhaust outlet 420 is adjacent to the ion exhaust port 310 and is disposed below the another part 230-2 of the discharge port 230 opposite to the discharge port 230. Specifically, the another part 230-2 of the discharge port 230 refers to another part of the discharge port 230 other than the part 230-1 of the discharge port in communication with the ion exhaust port 310. The exhaust outlet 420 may be disposed side by side with the ion exhaust port 310, so that air discharged out of the exhaust outlet 420 is mixed with ions discharged out of the ion exhaust port 310, and is then discharged out of the housing 100 from the air outlet 120. Moreover, the exhaust outlet 420 may be aligned with the another part 230-2 of the discharge port 230 so that the exhaust outlet 420 is in communication with the another part 230-2 of the discharge port 230. For example, the exhaust outlet 420 may be disposed below the another part 230-2 of the discharge port 230 in a manner of being immediately adjacent to the discharge port 230 or flush with the another part 230-2 of the discharge port 230, so that air discharged out of the air supply unit is discharged out of the exhaust outlet 420 upward through the another part 230-2 of the discharge port 230, and the liquid may enter the air supply unit from the another part 230-2 of the discharge port 230 through the exhaust outlet 420.

Specifically, the exhaust inlet 410 is disposed on a side surface of the casing 400 in a direction facing the air inlet 110. A lower end of the exhaust inlet 410 is lower than a lower end of the motor, that is, the lowest point of the exhaust inlet 410 is lower than the lower end of the motor. The liquid discharged out of the discharge port 230 enters the air supply unit through the exhaust outlet 420, that is, enters an inside of the casing 400, and the liquid flows downward under an action of its own gravity and accumulates at the bottom of the casing 400. When accumulating to a certain amount, the liquid will flow out of the casing 400 from the exhaust inlet 410. Since the lower end of the exhaust inlet 410 is lower than the lower end of the motor, the liquid accumulated in the casing 400 will flow out of the casing 400 from the exhaust inlet 410 before contacting the motor, thereby preventing the liquid from contacting the motor and affecting an operation of the motor.

Figure 7:
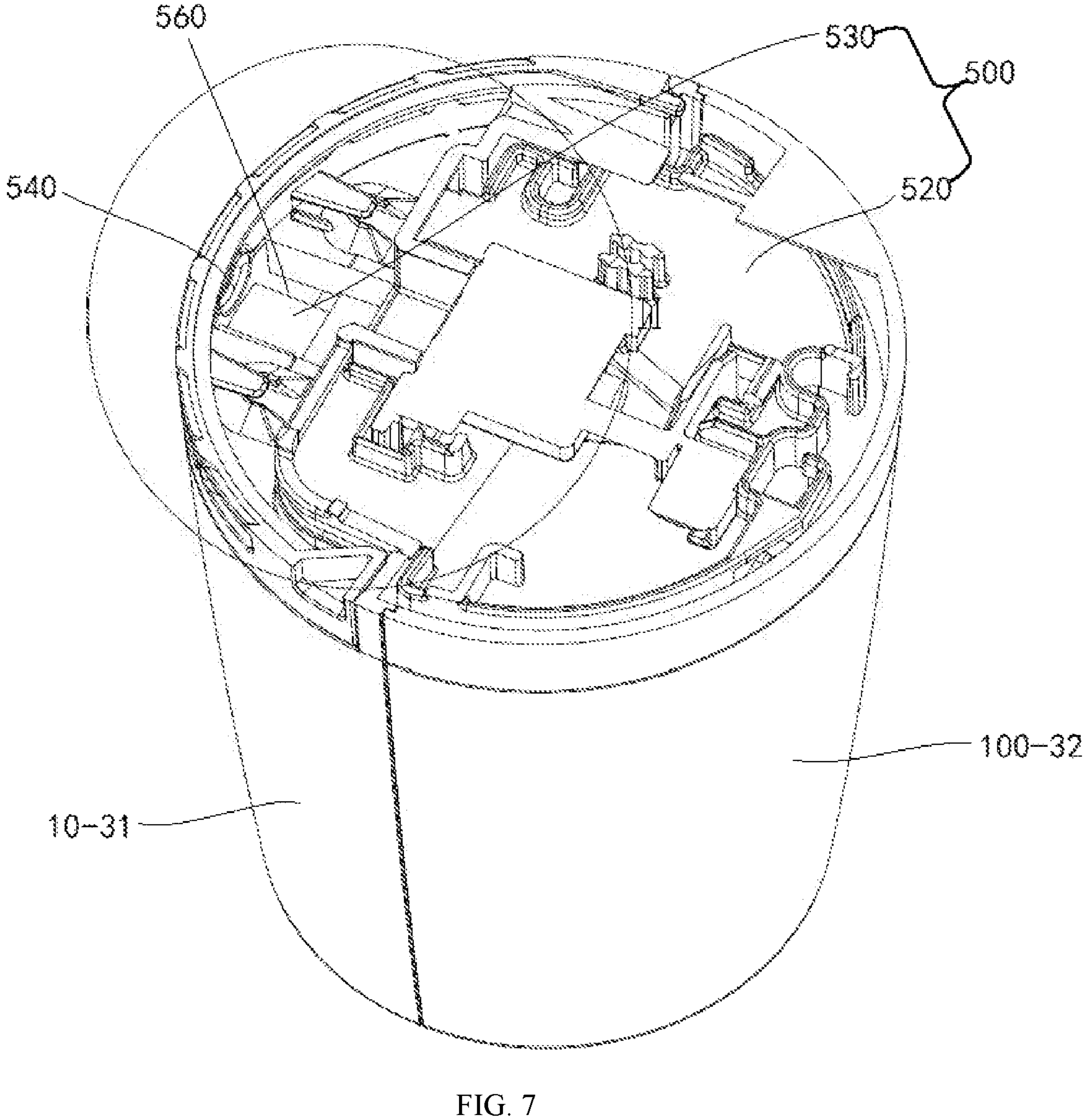
FIG. 7 is a cross-sectional view taken along line B-B of FIG. 5.
Figure 8:
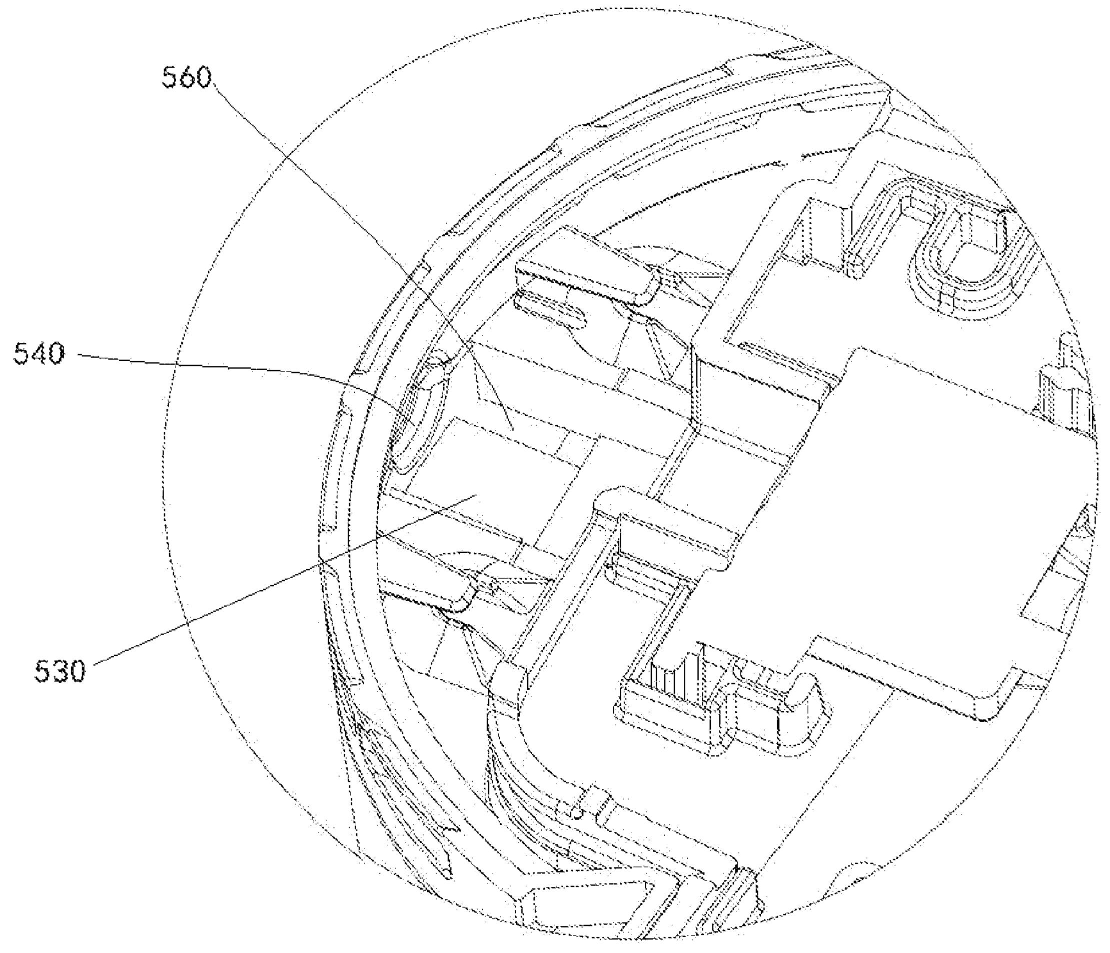
FIG. 8 is a partial enlarged view of a structure shown by a block in FIG. 7.
Figure 9:
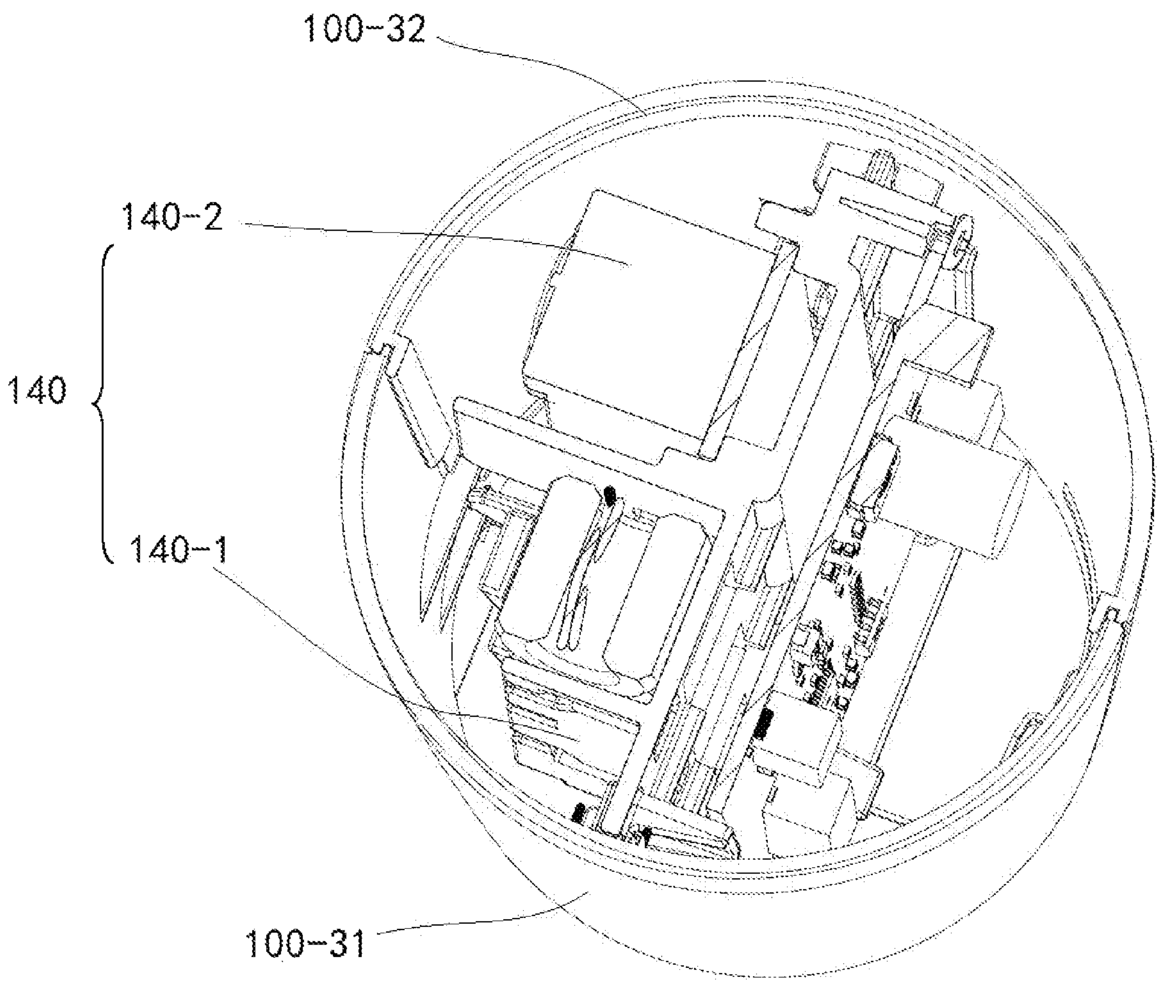
FIG. 9 is a lateral cross-sectional view taken along line C-C of FIG. 5.

FIG. 7 is a cross-sectional view taken along line B-B of FIG. 5. FIG. 8 is a partial enlarged view of the structure shown by a block in FIG. 7. FIG. 9 is a cross-sectional view taken along line C-C of FIG. 5. The inside of the housing 100 will be described in detail with reference to FIG. 7 to FIG. 9.

The housing 100 includes a partition plate 500 disposed horizontally and configured to divide the inner space of the housing 100 into a first space 130 and a second space 140.

Specifically, the first space 130 is located in an upper space of the housing 100, and is internally provided with the air supply unit, the ion generating unit 300 and the like.

The second space 140 is located in a lower space of the housing 100, and is internally provided with electrical components. The second space 140 may include an electrical component cavity 140-1 and a cavity 140-2 according to whether or not the electrical component is provided.

In other words, the first space 130 is formed above the partition plate 500, and the second space 140 is formed below the partition plate 500.

The partition plate 500 includes a receiving area 520 and a diverging area 530. The receiving area 520 and the diverging area 530 are connected to each other to form a complete partition plate 500. The receiving area 520 and the diverting area 530 may be integrally formed.

The receiving area 520 is located below the air supply unit and the ion generating unit 300 corresponding to the air supply unit and the ion generating unit 300, and is used to receive the liquid flowing downward from the exhaust inlet 410 of the casing 400. That is to say, when the liquid accumulated in the casing 400 reaches a certain amount, the liquid may flow out of the exhaust inlet 410. Then, the liquid may flow downward to the receiving area 520 under an action of its own gravity and may be received and accommodated by the receiving area 520. The receiving area 520 is provided with a vertical wall 510 at an edge of the receiving area 520 adjacent to an inner wall of the housing 100. The vertical wall 510 extends vertically upward to prevent the liquid received and accommodated by the receiving area 520 from flowing downward from the edge of the receiving area 520 and contacting the electrical component below, thereby affecting a safety of the apparatus.

The diverging area 530 is connected to the receiving area 520 so as to discharge the liquid in the receiving area 520 out of the housing 100. Specifically, the liquid flowing from the receiving area 520 may enter the diverging area 530. A part of the liquid entering the diverging area 530 may be discharged out of the side surface 100-3 of the housing 100 through a first drainage opening 540 penetrating the side surface 100-3 of the housing 100. For example, in a case of a small amount of liquid, the liquid may be discharged out of the housing 100 through the first drainage opening 540. In a case of a large amount of liquid, when the first drainage opening 540 is too late to discharge all the liquid, the liquid may enter the cavity 140-2 through an opening 560 provided close to the first drainage opening 540 and located above a subsequently described cavity 140-2. That is, the opening 560 corresponds to the subsequently described cavity 140-2 in the vertical direction, and the liquid flows downward to an inside of the cavity 140-2 through the opening 560.

The opening 560 penetrates the partition plate 500 and is in communication with the cavity 140-2 so as to guide the liquid in the diverging area 530 to the cavity 140-2.

The second space 140 below the partition plate 500 includes an electrical component cavity 140-1 and a cavity 140-2. The electrical component cavity 140-1 is internally provided with an electrical component, and the electrical component cavity is located below the receiving area 520 corresponding to the receiving area 520 of the partition plate 500. The electrical component includes a live part such as a circuit board, a battery or the like. The electrical component cavity 140-1 should avoid a contact with the liquid as much as possible.

The cavity 140-2 is a space other than the electrical component cavity 140-1 in the second space 140, that is, a space in which no component such as the electrical component is installed. The liquid flowing downward through the opening 560 enters the cavity 140-2, which may prevent the liquid from entering the electrical component cavity 140-1 so as to avoid contacting the electrical component. The liquid entering the inside of the cavity 140-2 flows downward to the bottom surface 100-2 of the housing 100 under an action of its own gravity.

A second drainage opening 550 penetrating the bottom surface 100-2 is provided on the bottom surface 100-2 of the housing 100, and the second drainage opening 550 communicates the cavity 140-2 with an external space of the housing 100. The liquid flowing into the cavity 140-2 flows to the bottom surface 100-2 under an action of its own gravity, and is then discharged out of the housing 100 through the second drainage outlet 550.

As described above, the liquid flowing in from the air outlet 120 is first received and accommodated by the waterproof part 200 below the air outlet 120. Under the action of the waterproof part 200, the liquid bypasses the ion exhaust port 310 and is discharged out of the discharge port 230 to the inside of the casing 400 of the air supply unit, and is discharged out of the exhaust inlet 410 of the casing 400 to the receiving area 520 of the partition plate 500 while avoiding contacting the motor, then flows from the receiving area 520 to the diverging area 530. A part of the liquid is discharged out of the housing 100 from the side surface 100-3 of the housing 100 through the first drainage opening 540. The remaining liquid enters the cavity 140-2 through the opening 560 so as to avoid contacting the electrical component in the electrical component cavity 140-1, and then flows to the bottom surface 100-2 of the housing 100, and is finally discharged out of the housing 100 from the second drainage opening 550 provided on the bottom surface 100-2.

The structure of the ion generating apparatus 10 has been described above.

The operation method of the ion generating apparatus 10 will be described below with reference to FIG. 2 to FIG. 9. When the ion generating apparatus 10 is activated, air is inhaled into the casing 400 of the air supply unit through the exhaust inlet 410 after entering the first space 130 of the ion generating apparatus 10 from the air inlet 110, and then discharged out of the exhaust outlet 420 of the volute shell 400. The exhaust outlet 420 is disposed opposite to the discharge port 230, and then the air is discharged upward from the discharge port 230 to an upper portion of the waterproof part 200. On the other hand, ions generated by the ion generator 330 are supplied to the ion exhaust port 310 along the ion air duct 320 and then discharged. The ion exhaust port 310 is disposed opposite to the discharge port 230, and the ions are discharged upward from the discharge port 230 to the waterproof part 200. At this time, the ions discharged out of the ion exhaust port 310 are mixed with the air discharged out of the exhaust outlet 420, and then discharged out of the air outlet 120 on the top surface 100-1 of the housing 100.

As shown in FIG. 2, when the user accidentally sprinkles a liquid, such as water, on the ion generating apparatus 10, the water may enter the housing 100 through the air outlet 120 on the top surface 100-1. As shown in FIG. 3, in the embodiment, the waterproof part 200 is provided below the air outlet 120, and the water entering from the air outlet 120 may be received and accommodated by the waterproof part 200. Since the water accumulation part 210 has a U-shaped longitudinal cross-section, and has a bottom surface parallel to the horizontal plane, the water may stay in the water accumulation part 210 rather than directly dropping into the inside of the housing 100. When a little more water enters from the air outlet 120, the water accumulated in the water accumulating part 210 may be slowly discharged out of the discharge port 230, and the water may be discharged to a space avoiding a contact with the electrical component through the discharge port 230, rather than being scattered around the inside of the housing 100, so that a contact of water with the electrical component and the like in the housing 100 may be avoided, and the safety may be improved.

In addition, although the ion exhaust port 310 of the ion generating unit 300 is staggered from the air outlet 120, once the water enters the ion generating unit 300, the generation of ions may be affected. Therefore, in order to further prevent the water from entering the ion generating unit 300, the waterproof part 200 is provided with the air guide 240 extending upward from a radially inner side of the ion exhaust port 310 toward the air outlet 120 side. The air guide 240 may not only guide the air with ions discharged out of the ion exhaust port 310 to the air outlet 120 smoothly, but also prevent the water entering from the air outlet 120 obliquely above the ion exhaust port 310 from directly dropping into the ion exhaust port 310, so that a possibility of water entering the ion generating unit 300 may be reduced and the generation of ions may be ensured.

In addition, when more water enters from the air outlet 120, the waterproof part 200 further includes a flow guide 220 connected to the water accumulating part 210 in order to prevent the water from overflowing into the ion generating unit 300 from the ion exhaust port 310 when an excessive water accumulated in the water accumulation portion 210 may not be discharged out of the discharge port 230 in time. Relative to the water accumulating part 210, the flow guide 220 is disposed on a side close to the ion exhaust port 310. The flow guide 220 includes an inclined surface 200-5, and water may flow along the inclined surface 200-5 from a side of the ion exhaust port 310 to a side of the discharge port 230; the inclined surface 200-5 may speed up a discharge speed of the water in the flow guide 220, and reduce an overflow of the water from the ion exhaust port 310 when the water is full in the flow guide 220. In addition, an outer circumferential edge of the ion exhaust port 310 is provided with an extending wall 310-1 whose top end is higher than a bottom surface of the waterproof part 200, and the extending wall 310-1 on a side close to the flow guide 220 serves as an inner sidewall of the flow guide 220, so that water dropped from the air outlet 120 into the flow guide 220 may be suppressed from splashing into the ion exhaust port 310, a contact between water and the ion generating unit 300 may be further suppressed, and the generation of ions may be ensured.

As described above, the waterproof part 200 includes the water accumulating part 210 and the flow guide 220. The bottom surface of the water accumulating part 210 is parallel to the horizontal plane, and the flow guide 220 includes an inclined surface 200-5, so the water flowing into the water accumulating part 210 may flow slower than the water in the flow guide 220, which may prevent the water flowing into the water accumulating part 210 and the water flowing into the flow guide 220 from entering the discharge port 230 at the same time. That is to say, an effective divergence may be achieved by increasing a flow speed of the water in the flow guide 220 and slowing down a flow speed of the water in the water accumulating part 210, which may suppress a possibility of water overflow due to a failure in discharge in time. In addition, the water accumulating part 210 and the flow guide 220 are connected by the boss 260 to further effectively diverge the water in the waterproof part 200.

Further, in the embodiment, the exhaust outlet 420 of the casing 400 is disposed opposite to the discharge port 230, so water discharged out of the discharge port 230 may enter the casing 400 from the exhaust outlet 420. As shown in FIG. 5, the casing 400 is longitudinally placed in the first space 130, and a side surface of the casing 400 is provided with the exhaust inlet 410. A lower end of the exhaust inlet 410 is lower than a lower end of the motor, so water entering the casing 400 may be stored in a lower portion of the casing 400. When rising to the lower end of the exhaust inlet 410, the water may flow out from the exhaust inlet 410 so as to avoid a contact with the motor, which may further suppress a contact between the water and the live part and improve the safety.

The water discharged out of the exhaust inlet 410 may flow into the receiving area 520 of the partition plate 500 provided below the air supply unit. A vertical wall 510 is provided at a position of the receiving area 520 adjacent to the housing 100, which may suppress the water from flowing from a gap between the partition plate 500 and the housing 100 to the electrical component cavity 140-1 in the second space below the partition plate 500, and further suppress a contact of the water with the electrical component and the like in the electrical component cavity 140-1.

Furthermore, as shown in FIG. 7, the water flowing to the receiving area 520 may flow to the diverging area 530 adjacent to the receiving area 520 again. When there is only a small amount of water in the receiving area 520, the water may first be discharged out of the housing 100 from the first drainage opening 540; when there is a large amount of water in the receiving area 520, in order to prevent the first drainage opening 540 from being unable to discharge the water in time, an opening 560 penetrating a bottom surface of the partition plate is provided beside the first drainage opening 540, and a part of the water may flow into the opening 560. The opening 560 is disposed above the cavity 140-2, and the water flowing through the opening 560 may flow into the cavity 140-2, and is then discharged out of the housing 100 from the second drainage opening 550 in communication with the cavity 140-2 and penetrates the bottom surface 100-2 of the housing 100. In this way, not only a speed at which the water is discharged out of the housing 100 may be accelerated, but also a contact between the water and the electrical component may be further avoided, thereby the safety may be improved.

So far, the embodiments of the present disclosure have been described in detail with reference to the accompanying drawings. Based on the above-mentioned descriptions, those skilled in the art should have a clear understanding of the present disclosure.

It should be noted that, in the accompanying drawings or the context of the description, implementations that are not shown or described are all in a form known to those skilled in the art, and are not described in detail. In addition, the above-mentioned definitions of each element are not limited to the various specific structures and shapes mentioned in the embodiments, which may be simply modified or replaced by those skilled in the art. For example:

under a condition that other structures remain unchanged, the housing is a cuboid, and the waterproof part has a "

回"-shaped structure. The above-mentioned specific embodiments further describe the objectives, technical solutions and beneficial effects of the present disclosure in detail. It should be understood that the above are only specific embodiments of the present disclosure, and are not intended to limit the present disclosure. Any modification, equivalent replacement, improvement, etc. made within the spirit and principle of the present disclosure shall be included within the scope of protection of the present disclosure.

The present disclosure provides an ion generating apparatus. A waterproof part is disposed below the air outlet to receive the liquid flowing in from the air outlet, and a flow path of the inflowing liquid is controlled, which may not only prevent the liquid from entering the ion generating unit from the ion exhaust port to affect the generation of ions, but also allow the liquid entering the inside of the housing to flow out of the housing along a path that does not come into contact with the electrical component.

Those skilled in the art should understand that ordinal numbers such as "first," "second," etc., used in the description and claims are only to modify corresponding elements, which does not mean any ordinal numbers of the elements, or any order of an element and another element, or any order in a manufacturing method. The ordinal numbers are used only to clearly distinguish an element having a name from another element having the same name.

Finally, it should be noted that the above-mentioned embodiments are only used to illustrate the technical solutions of the present disclosure, but are not intended to limit them. Although the present disclosure has been described in detail with reference to the above-mentioned embodiments, those skilled in the art should understand that: modifications may be made to the technical solutions described in the above-mentioned embodiments, or some of the technical features may be equivalently replaced; and these modifications or substitutions do not make an essence of the corresponding technical solutions deviate from the spirit and scope of the technical solutions in the embodiments of the present disclosure.

What is claimed is:

1. An ion generating apparatus, comprising:

a housing provided with an air inlet and an air outlet; and an ion generating unit provided with an ion generator for generating an ion and an ion exhaust port for discharging the generated ion, wherein the ion discharged out of the ion exhaust port is discharged out of the housing through the air outlet, wherein, a waterproof part is provided below the air outlet, and the waterproof part comprises:

a discharge port penetrating the waterproof part, and the discharge port is in communication with an inside of the housing; and a guide part having a receiving space for receiving a liquid flowing in from the air outlet and guiding the liquid to the discharge port while bypassing the ion exhaust port, wherein the guide part and the discharge port are connected to form a closed loop.

2. The ion generating apparatus according to claim 1, wherein the ion exhaust port is disposed below a part of the discharge port, and a part of the guide part is formed as an inclined surface inclined upward in a direction from a side connected with the discharge port to the ion exhaust port and away from the discharge port.

3. The ion generating apparatus according to claim 2, wherein the guide part comprises a water accumulating part and a flow guide, the water accumulating part, the flow guide and the discharge port are sequentially connected with each other to form the closed loop, and a bottom surface of the water accumulating part is parallel to a horizontal plane and the flow guide comprises the inclined surface.

4. The ion generating apparatus according to claim 1, wherein an outer circumferential edge of the ion exhaust port is provided with an extending wall extending upward, and an upper end of the extending wall is higher than a bottom surface of the waterproof part.

5. The ion generating apparatus according to claim 1, wherein the ion exhaust port is horizontally staggered from the air outlet, and the waterproof part comprises an air guide part extending upward from a side of the ion exhaust port away from the air outlet to a side of the air outlet.

6. The ion generating apparatus according to claim 2, wherein the housing further comprises an air supply unit, and the air supply unit comprises:

a motor;

a fan blade configured to rotate through a drive of the motor and guide a flow of air; and a casing accommodating the motor and the fan blade, wherein the casing comprises an exhaust inlet and an exhaust outlet, air entering through the air inlet enters the casing from the exhaust inlet and is discharged out of the casing through the exhaust outlet under guidance of the fan blade, and a lower end of the exhaust inlet is lower than a lower end of the motor.

7. The ion generating apparatus according to claim 6, wherein the exhaust outlet is adjacent to the ion exhaust port and is disposed below another part of the discharge port, and a liquid discharged out of the discharge port flows into the air supply unit through the exhaust outlet.

8. The ion generating apparatus according to claim 7, wherein the housing comprises a partition plate disposed horizontally and configured to divide an inner space of the housing into a first space at an upper portion and a second space at a lower portion, the first space is configured to accommodate the air supply unit and the ion generating unit; and the second space comprises an electrical component cavity installed with an electronic component and a cavity other than the electrical component cavity.

9. The ion generating apparatus according to claim 8, wherein the partition plate comprises:

a receiving area located below the air supply unit and configured to receive the liquid flowing out from the air supply unit, wherein the receiving area is provided with a vertical wall at an edge of the receiving area adjacent to an inner wall of the housing; and a diverging area connected to the receiving area and configured to diverge the liquid in the receiving area to be discharged out of the housing.

10. The ion generating apparatus according to claim 9, wherein the diverging area comprises:

a first drainage opening penetrating a side surface of the housing, and an opening located close to the first drainage opening, and the opening penetrates the partition plate above the cavity.

11. The ion generating apparatus according to claim 10, wherein a second drainage opening penetrating the housing is provided on a bottom surface of the housing, and the second drainage opening is in communication with the cavity.

12. The ion generating apparatus according to claim 6, further comprising:

a control part configured to control the air supply unit and the ion generating unit.

* * * * *